April 25, 1939.  D. L. PARKHURST  2,155,442
MEANS FOR SAMPLING A LIQUID
Filed Sept. 24, 1938
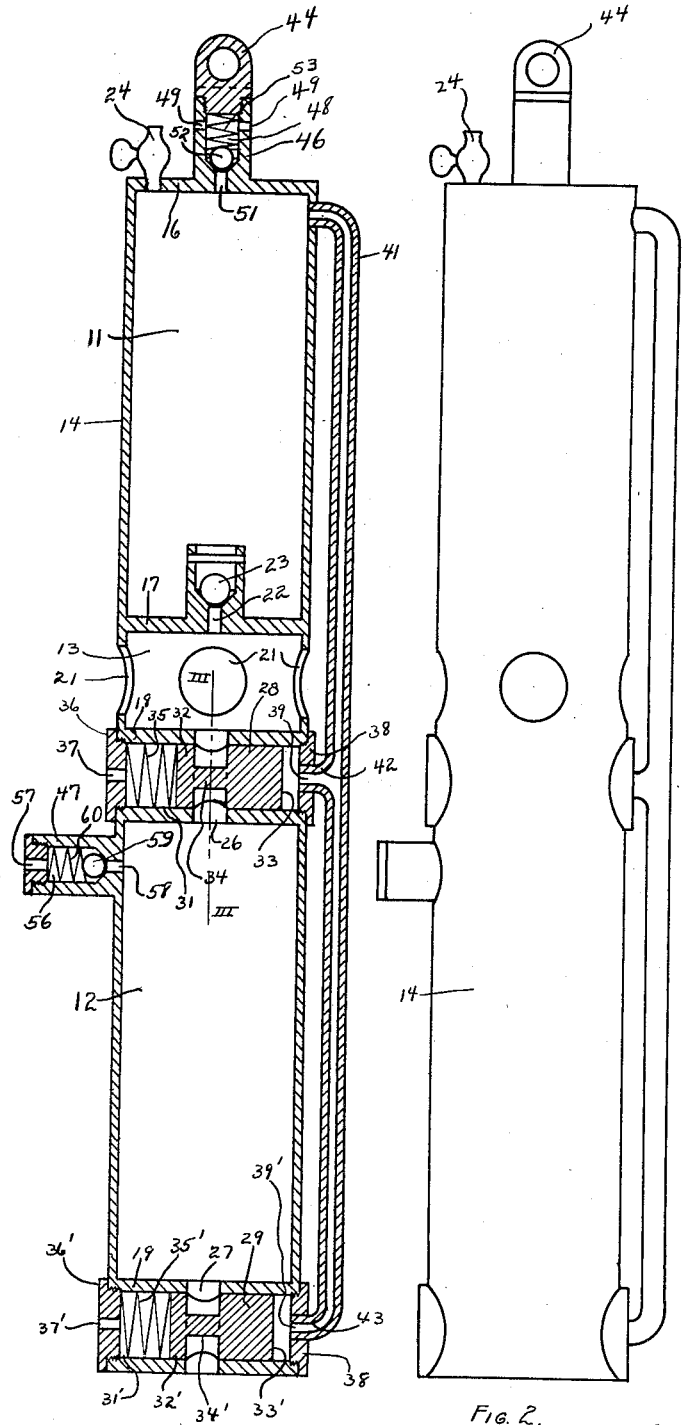
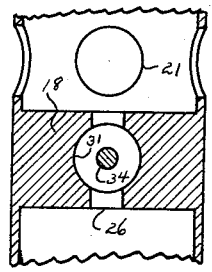
FIG. 3.
FIG. 2.
FIG. 1.
Inventor
DOUGLAS L. PARKHURST.
By J. F. Motherhead
Attorney Patented Apr. 25, 1939

2,155,442

UNITED STATES PATENT OFFICE 2,155,442

MEANS FOR SAMPLING A LIQUID

Douglas L. Parkhurst, Chevy Chase, Md., assignor to the Government of the United States, as represented by the Secretary of Commerce and his successors in office.

Application September 24, 1938, Serial No. 231,577

18 Claims. (Cl. 137—18)

(Granted under the act of March 3, 1883, as amended April 30, 1928; 370 O. G. 757).

This invention relates to sampling a liquid, such as sea water, at any desired depth. Devices for this purpose may be provided with a chamber having normally open ports which permit liquid to flow freely through the chamber while the device is being lowered, but when the desired depth is reached, it is highly desirable that the sampling chamber be effectively sealed, so that the withdrawn sample will accurately represent the character or condition of the liquid at the selected depth. These devices are usually lowered over the side of a boat, and it frequently happens that the boat will roll or rock from side to side while the cable attached to the device is being paid out to lower the device. This rocking of the boat causes the device to rise intermittently in its descent. It will be evident that this same condition may cause an intermittent rising and falling of the device after the cable has been paid out sufficiently to lower the device to the depth from which a sample is desired. In these circumstances, the length of cable which has been paid out may not accurately represent the depth from which a sample is taken.

For instance, a device, which has been used quite extensively, comprises a chamber having normally open ports and a propeller which is adapted to rotate to close these ports when the device is drawn upwardly through the water. Obviously, when the boat rolls and causes the device to rise intermittently, either while the device is being lowered, or after it has been lowered to the desired depth, the aforementioned propeller will rotate in a direction to close the ports. Under these conditions it may happen that the intermittent rising of the device during its descent will cause the propeller to close the sampling chamber ports so tightly that when the device resumes its descent the propeller will not have sufficient torque to open these ports. In this event, the sample withdrawn would be from a level above that from which a sample was desired, and the more important aspect of the situation is that those withdrawing a sample under these conditions have no means of knowing whether the withdrawn sample came from the desired depth or from a higher level.

The purposes of the present invention are to provide for overcoming difficulties of the kind just mentioned; to provide for effectively sealing the sampling chamber of a device of the class described after it has been filled with liquid from the depth desired; to provide for maintaining adequate pressure for sealing the sampling chamber as the device is withdrawn and for avoiding excessive pressures; and to improve the operation of a device of the class described so as to assure that liquid withdrawn by the device will be from the depth desired.

In accordance with this invention, these desirable objectives may be attained by utilizing a pressure substantially corresponding to that of the surrounding liquid at the level or depth from which a sample is desired, for sealing the ports of the sampling chamber as the device is drawn upwardly through the water. This may be accomplished automatically by utilizing the prevailing pressure of the surrounding liquid through which the device is lowered for creating a pressure which may be maintained for sealing the sampling chamber when the device is withdrawn. When the device is used for withdrawing samples from depths at which the prevailing pressures are greater than the device may be adapted conveniently to withstand, the pressure maintained for sealing the ports of the sampling chamber as well as the pressure within the latter chamber may be controlled so as to maintain a pressure differential entirely adequate for sealing the sampling chamber without maintaining a pressure sufficient to burst the device as the pressure of the surrounding media decreases during its ascent to the surface. The ports of the sampling chamber may be opened and maintained open by increasing pressure of the surrounding liquid, and these ports may be closed and effectively sealed on a decrease in pressure of the surrounding liquid, as by applying pressure created or accumulated during the descent of the device, for sealing the sampling chamber as the device is withdrawn. This action may be entirely automatic, without manual or other adjustment or control. Therefore, if the device should rise intermittently during its descent or after it has reached the desired depth, the rising of the device from any depth may be effective for sealing the sampling chamber, but each time the device descends to the desired depth, it is assured that the ports of the sampling chamber will open in response to the pressure of the surrounding liquid.

The features of the invention are illustrated in the accompanying drawing, wherein:

Fig. 1 is a vertical section through the longitudinal axis of a device for sampling sea water at any depth desired;

Fig. 2 is an elevation of the device shown in Fig. 1; and

Fig. 3 is a section along the line III—III of Fig. 1.

The embodiment selected for illustration comprises upper and lower chambers 11 and 12, respectively (Fig. 1), which preferably are arranged in superposed relation with a space 13 between these chambers to provide for discharge of liquid from the lower chamber and for admission of liquid to the upper chamber. This desirable relationship of the upper and lower chambers and intervening space may be provided conveniently by a structure comprising a substantially cylindrical shell 14 provided with transverse walls 16, 17, 18 and 19 spaced longitudinally of the shell so that the walls 16 and 17 form with the shell the upper chamber, while the walls 18 and 19 form with the shell the lower chamber. The portions of the shell extending about the space 13 between the chambers may be provided with openings 21 of appropriate size and number to provide for adequate flow of liquid to and from the space 13.

In order that one of these chambers, as the upper chamber 11, may function automatically as a means for creating or accumulating and maintaining a pressure substantially equal to that of the surrounding liquid, this chamber may have a port 22 disposed at any convenient location, but preferably in the lower wall 17, and suitable means, such as a check valve 23, may be provided for controlling the flow through this port. This chamber may also be provided with any suitable means, such as a petcock 24, for relieving the pressure within the chamber, when this is desired.

The chamber for sampling liquid at the desired depth, preferably the lower chamber 12 as shown, may have ports 26 and 27 disposed preferably in the upper and lower transverse end walls 18 and 19, respectively. Flow through these ports may be controlled by double acting, spring biased, pressure actuated piston valves 28 and 29, respectively. The valve 28 may be mounted to reciprocate in a transverse bore 31 formed in the upper end wall 18. This valve may comprise spaced piston heads 32 and 33 connected by a rod 34 (Fig. 3) which is disposed across the port 26 when this port is open. This port is adapted to be closed by the head 33 when the valve is moved to the left as viewed in Fig. 1. A light, expansible spring 35 may be interposed between the head 32 and a suitable abutment, such as the plug 36 which may be fixedly mounted in the bore 31 in any convenient manner, as by having threaded engagement therewith, as shown. This plug may be provided with an opening or port 37 for admitting the surrounding liquid to the bore 31 and against the head 32 of the valve 28. The opposite end of the bore 31 may have a plug 38 fixedly mounted therein, as by having threaded engagement therewith, as shown, and this plug may also have a centrally disposed port 39 for admitting pressure fluid to the bore 31 and against the head 33 of the valve.

Flow through the port 27 in the lower transverse wall of the chamber 12 is adapted to be controlled by the valve 29 and parts associated therewith which are identical in construction, relative arrangement and operation with the parts just described with reference to the valve 28. Therefore, the valve 29 and its associated parts are designated by the same reference characters bearing prime marks, as those applied to corresponding parts forming a part of or associated with the valve 28, and further description is deemed unnecessary. The valves 28 and 29 may be subjected to the pressure prevailing in the chamber 11 by means of a tube 41 connected preferably to the upper end of the chamber 11 and having connections 42 and 43 to the ports 39 and 39' in the plugs 38 and 38', respectively. The device may be equipped with suitable means, such as the eye 44, to receive an attaching cable, or the like.

In using this device as thus far described herein, for sampling a liquid, such as sea water for example, all liquid is first removed from the pressure chamber 11 and the petcock 24 is closed. In this condition the pressure chamber may contain only atmospheric air, or any other suitable elastic fluid. The device may then be lowered through the sea water to the desired depth. As the device descends, the sea water surrounding the device enters the ports 37 and 37' with the result that the heads 32 and 32' of the valves 28 and 29, respectively, are subjected to the pressure of the surrounding sea water. The sea water also passes through the port 22 and the check valve 23 into the pressure chamber 11. As the sea water enters this pressure chamber, it compresses the air in this chamber until the pressure within the chamber is equal to the pressure of the surrounding sea water. This pressure is transmitted through the tube 41, the connections 42 and 43 to the bores 31 and 31' and against the heads 33 and 33', respectively, of the valves 28 and 29. As the device descends, the pressure in the chamber 11 always equals the pressure of the surrounding sea water and, therefore, the opposite heads of the valves 28 and 29 are subjected to equal and opposite pressures (neglecting the springs) and the valves remain in open position as shown. When the device rises, the pressure in the chamber 11 exceeds that of the surrounding sea water and the check valve 23 closes automatically in response to this pressure difference and thus maintains in the chamber 11 a pressure substantially equal to the pressure of the sea water at the greatest depth to which the device has been lowered. Also, as the device rises, the pressure of the surrounding sea water on the heads 32 and 32' of the valves 28 and 29, respectively, decreases, so that the greater pressure, which is maintained in the chamber 11 and acts on the heads 33 and 33', becomes effective to move the valves 28 and 29 to the left, as viewed in Fig. 1, and the heads 33 and 33' effectively close the ports 26 and 27, respectively.

It will be evident from the foregoing that, while the device descends, the ports 26 and 27 of the sampling chamber 12 remain open and sea water passes freely through this chamber, and that the lower port 27 constitutes a port for the ingress of sea water while the upper port 26 constitutes a port for the egress of sea water from the chamber. Whenever the pressure in the chamber 11 exceeds the pressure of the surrounding sea water, the valves 28 and 29 respond to this pressure difference and close the ports 26 and 27. If the device should be lowered to a given depth and then rise intermittently from that depth, the ports 26 and 27 of the sampling chamber would close, as just described, each time the device ascended to a higher level, and each time the device descended to the greatest depth previously attained, or to a greater depth than any previously attained, these ports would open. When the device is withdrawn from the sea, the pressure maintained in the chamber 11 and utilized for holding the ports of the sampling chamber closed, is substantially equal to the pressure of the sea water at the greatest depth to which the device has been lowered.

It will be evident that this pressure may be so great as to render it extremely difficult to open the ports of the sampling chamber. However, when the device has been withdrawn from the sea and it is desired to empty the sample of sea water from the sampling chamber, the petcock 24 may be opened to relieve the pressure in the pressure chamber 11. When this is done, the valves 28 and 29 open readily, as will be understood. The purpose of the springs 35 and 35' is to prevent the valves 28 and 29 from being too sensitive to slight variations in pressure, so that comparatively slight changes in pressure, which are sometimes difficult to avoid, will not be effective more or less continuously for opening and closing the ports of the sampling chamber, or for throttling the flow through these ports.

It is contemplated that a device constructed in accordance with this invention may be used for withdrawing samples of liquid from depths where very high pressures are encountered. For example, at a depth of twenty thousand feet the pressure of sea water is roughly ten thousand pounds per square inch, and at thirty-six thousand feet, the pressure is roughly eighteen thousand pounds per square inch. Extremely high pressures of this order would brust the chambers 11 and 12 unless some precautions were taken. This will be evident when it is considered that with the device at the depth from which a sample is to be withdrawn the pressure within the chambers 11 and 12 is equal to the pressure of the surrounding liquid, but as the device ascends toward the surface, the pressure of the surrounding liquid decreases while the pressure within the chambers 11 and 12 remains constant. This is not objectionable as long as the pressures within the chambers 11 and 12 are not excessive, but if the device should be withdrawn from a depth of around twenty thousand feet, the pressure within the chambers 11 and 12 would still be approximately ten thousand pounds per square inch while the exterior of the device would be subjected only to atmospheric pressure. This great pressure difference is more than the device can be expected to withstand.

In order that the device may be subjected only to ordinary pressures when it is withdrawn from depths where the pressures are high, the chambers 11 and 12 may be equipped at any convenient locations with suitable pressure relief valves, such as the valves 46 and 47, respectively, which are adapted to relieve the pressure in these chambers as the pressure difference tends to exceed what is considered a safe pressure, such, for example, as a pressure of twenty pounds per square inch.

The valve 46 may comprise a chamber 48 having ports 49 in its side walls and a port 51 leading to the chamber 11 and controlled by a valve member 52 adapted to be held on its seat with a predetermined pressure by an expansible spring 53. Similarly, the valve 47 may comprise a chamber 56 having a port 57 in its outer end wall and a port 58 leading to the chamber 12 and controlled by a valve member 59 adapted to be held on its seat with a predetermined pressure by an expansible spring 60.

When a device embodying the features and the principle disclosed herein is used, it is assured that the sample of liquid withdrawn will always be from the greatest depth to which the device has been lowered.

It should be understood that the present disclosure is for the purposes of illustration only, and that the invention includes all modifications and equivalents which fall within the scope of the appended claims.

The invention described herein, if patented, may be manufactured and used by or for the Government for governmental purposes without the payment to me of any royalty thereon.

What I claim is:

1. A device for taking a sample of liquid, such as sea water, at any desired depth, comprising a chamber having ports for the ingress and egress of liquid, valve means for controlling flow through said ports, means responsive to increasing pressure of the surrounding liquid for maintaining said ports open, and means effective on a decrease in pressure of the surrounding liquid for causing said valve means to close said ports.

2. A device for taking a sample of liquid, such as sea water, at any desired depth, comprising a chamber having ports for the ingress and egress of liquid, valve means for controlling flow through said ports, means tending to hold said ports open, means responsive to increasing pressure of the surrounding liquid for maintaining said ports open, and means effective on a decrease in pressure of the surrounding liquid for causing said valve means to close said ports.

3. A device for taking a sample of liquid, such as sea water, at any desired depth, comprising a chamber having ports for the ingress and egress of liquid, valve means for controlling flow through said ports, resilient means tending to urge said valve means to a position to open said ports, means responsive to increasing pressure of the surrounding liquid for maintaining said ports open, and means effective on a decrease in pressure of the surrounding liquid for causing said valve means to close said ports.

4. A device for taking a sample of liquid, such as sea water, at any desired depth, comprising a substantially cylindrical chamber having ports in the ends thereof, double acting piston valves for controlling flow through said ports, each of said valves being responsive to increasing pressure of the surrounding liquid for maintaining said ports open, and means effective on a decrease in pressure of the surrounding liquid for causing said valves to close said ports.

5. A device for taking a sample of a liquid, such as sea water, at any desired depth, comprising a chamber having ports for ingress and egress of liquid, valve means for controlling flow through said ports, means responsive to the pressure of the surrounding liquid for accumulating pressure substantially equal to that of the surrounding liquid, means for maintaining substantially said accumulated pressure on decrease in pressure of the surrounding liquid, means responsive to increasing pressure of the surrounding liquid for maintaining said ports open, and means effective on a decrease in pressure of the surrounding liquid for applying said accumulated pressure to said valve means to hold said ports closed.

6. A device for taking a sample of a liquid, such as sea water, at any desired depth, comprising a chamber having ports for ingress and egress of liquid, valve means for controlling flow through said ports, means responsive to the pressure of the surrounding liquid for accumulating pressure substantially equal to that of the surrounding liquid, means for maintaining substantially said accumulated pressure on decrease in pressure of the surrounding liquid, means responsive to increasing pressure of the surrounding liquid for maintaining said ports open, means effective on a decrease in pressure of the surrounding liquid for applying said accumulated pressure to said valve means to hold said ports closed, and means responsive to a predetermined decrease in pressure of the surrounding liquid for reducing said accumulated pressure only to a pressure greater than that of the surrounding liquid.

7. A device for taking a sample of liquid, such as sea water, at any depth desired, comprising a chamber having ports for ingress and egress of liquid, valve means for controlling flow through said ports, means tending to urge said valve means to a position to open said ports, means responsive to increasing pressure of the surrounding liquid for maintaining said ports open, means responsive to the pressure of the surrounding liquid for accumulating pressure substantially equal to that of the surrounding liquid, means for maintaining substantially said accumulated pressure on decrease in pressure of the surrounding liquid, and means effective on a decrease in pressure of the surrounding liquid for applying said accumulated pressure to said valve means to hold said ports closed.

8. A device for sampling a liquid, such as sea water, at any depth desired, comprising a chamber having ports for ingress and egress of liquid, valve means for controlling flow through said valve ports, resilient means tending to urge said valve means to a position to open said ports, means responsive to increasing pressure of the surrounding liquid for maintaining said ports open, means responsive to pressure of the surrounding liquid for accumulating pressure substantially equal to that of the surrounding liquid, means for maintaining substantially said accumulated pressure on decrease in pressure of the surrounding liquid, and means effective on a decrease in pressure of the surrounding liquid for applying said accumulated pressure to said valve means to hold said ports closed.

9. A device for sampling a liquid, such as sea water, at any depth desired, comprising a chamber having ports for ingress and egress of liquid, valve means movable between open and closed positions for controlling flow through said ports, means for applying the pressure of the surrounding liquid to the valve means for holding the latter means in their open positions, means responsive to pressure of the surrounding liquid for accumulating pressure substantially equal to that of the surrounding liquid, means for maintaining substantially said accumulated pressure on decrease in pressure of the surrounding liquid, and means for applying said accumulated pressure to the valve means for moving the latter means to closed position.

10. A device for sampling a liquid, such as sea water, at any depth desired, comprising a chamber having ports for ingress and egress of liquid, valve means movable between open and closed positions for controlling flow through said ports, means for applying the pressure of the surrounding liquid to the valve means for holding the latter means in their open positions, means responsive to pressure of the surrounding liquid for accumulating pressure substantially equal to that of the surrounding liquid, means for maintaining substantially said accumulated pressure on decrease in pressure of the surrounding liquid, means for applying said accumulated pressure to the valve means for moving the latter means to closed position, and means responsive to a predetermined decrease in pressure of the surrounding liquid for reducing said accumulated pressure only to a pressure greater than that of the surrounding liquid.

11. A device for sampling a liquid, such as sea water, at any depth desired, comprising a chamber having ports for the ingress and egress of liquid, valve means movable between open and closed positions for controlling flow through said ports, means tending to urge said valve means to their open positions, means for applying the pressure of the surrounding liquid to the valve means for moving the latter means to their open positions, means responsive to pressure of the surrounding liquid for accumulating pressure substantially equal to that of the surrounding liquid, means for maintaining substantially said accumulated pressure on decrease in pressure of the surrounding liquid, and means for applying said accumulated pressure to the valve means for moving the latter means to their closed positions.

12. A device for sampling a liquid, such as sea water, at any depth desired, comprising a sampling chamber having ports for the ingress and egress of liquid, valve means for controlling flow through said ports, a pressure chamber adapted to contain an elastic fluid under pressure, and means responsive to excess of pressure within the pressure chamber over the pressure of the surrounding liquid for actuating said valve means to close the ports of the sampling chamber.

13. A device for sampling a liquid, such as sea water, at any depth desired, comprising a sampling chamber having ports for the ingress and egress of liquid, valve means for controlling flow through said ports, a pressure chamber adapted to contain an elastic fluid, said chamber having a port for admitting the surrounding liquid, means responsive to excess of pressure within the pressure chamber over that of the surrounding liquid for closing said port, means responsive to a predetermined decrease in pressure of the surrounding liquid for relieving the pressure in the pressure chamber only sufficiently to maintain a predetermined excess of pressure in the pressure chamber over that of the surrounding liquid, means for applying the pressure within the pressure chamber for actuating the valve means of the sampling chamber in a closing direction, and means for applying the pressure of the surrounding liquid for actuating said valve means in an opening direction.

14. A device for sampling a liquid, such as sea water, at any depth desired, comprising a sampling chamber having ports for the ingress and egress of liquid, valve means for controlling flow through said ports, a pressure chamber adapted to contain an elastic fluid, said chamber having a port for admitting the surrounding liquid, means responsive to excess of pressure within the pressure chamber over that of the surrounding liquid for closing said port, means for applying the pressure within the pressure chamber for actuating the valve means of the sampling chamber in a closing direction, and means for applying the pressure of the surrounding liquid for actuating said valve means in an opening direction.

15. A device for sampling a liquid, such as sea water, at any depth desired, comprising a sampling chamber having ports for the ingress and egress of liquid, valve means for controlling flow through said ports, a pressure chamber adapted to contain an elastic fluid, means for subjecting elastic fluid in the pressure chamber to pressure substantially equal to that of the surrounding liquid, means for maintaining a pressure in the pressure chamber substantially equal to the maximum pressure of the surrounding liquid, means for applying the pressure prevailing in the pressure chamber for actuating the valve means of the sampling chamber in a closing direction, and means for applying the pressure of the surrounding liquid for actuating said valve means in an opening direction.

16. A device for sampling a liquid, such as sea water, at any depth desired, comprising a sampling chamber having ports for the ingress and egress of liquid, valve means for controlling flow through said ports, a pressure chamber adapted to contain an elastic fluid, said pressure chamber having a port for admitting the surrounding liquid, a check valve for controlling the flow through the latter port to maintain pressure in the pressure chamber substantially equal to the maximum pressure of the surrounding liquid, means for applying the pressure prevailing in the pressure chamber for actuating the valve means of the sampling chamber in a closing direction, and means for applying the pressure of the surrounding liquid for actuating the latter valve means in an opening direction.

17. A device for sampling liquid, such as sea water, at any depth desired, comprising upper and lower chambers arranged to descend and ascend through liquid in superposed relation, one of said chambers being a sampling chamber and having ports for the ingress and egress of liquid, the other of said chambers being a pressure chamber adapted to contain an elastic fluid, and means responsive to excess of pressure within the pressure chamber over the prevailing pressure of the surrounding liquid for closing the ports of the sampling chamber.

18. A device for sampling liquid, such as sea water, at any depth desired, comprising an upper pressure chamber and a lower sampling chamber arranged to descend and ascend through liquid substantially in superposed relation, the sampling chamber having ports for the ingress and egress of liquid and being spaced from the pressure chamber to provide a discharge passage between these chambers, the pressure chamber being adapted to contain an elastic fluid, and means responsive to excess of pressure within the pressure chamber over the prevailing pressure of the surrounding liquid for closing the ports of the sampling chamber.

DOUGLAS L. PARKHURST.